UNITED STATES PATENT OFFICE.

LUDWIG SAARBACH, OF NEW YORK, N. Y.

PROCESS OF PURIFYING TANNIC EXTRACTS.

SPECIFICATION forming part of Letters Patent No. 404,440, dated June 4, 1889.

Application filed December 12, 1888. Serial No. 293,361. (No specimens.)

*To all whom it may concern:*

Be it known that I, LUDWIG SAARBACH, of the city, county, and State of New York, have invented a new and useful Process of Refining and Purifying Tannic Extracts, of which the following is a full, true, and exact description.

The object of my invention is to provide a new method of clarifying tannic extracts, by means of which the same will be obtained in a superior and clear condition.

My process can be applied for purifying tannin obtained from nut-galls, sumac-leaves, barks, wood, husks, and the like. My improved method will be described mainly as it relates to Chinese galls, though I desire it to be understood that any other vegetable matter containing tannin may be treated in a similar manner.

The watery tannic extracts are refined in the following manner, namely: The tannin-juices extracted and obtained by the usual processes are heated to a temperature of about 140° Fahrenheit, and then acetate of lead is added in the proportion of one hundred and twenty-five grams per one hundred liters of juice and per degree of density—that is, one hundred liters solution at 10° Baumé require twelve hundred and fifty grams lead acetate. It is practicable to introduce the acetate of lead in a twenty-five per cent. watery solution. The materials are agitated for about one hour, and are always kept warm during that time. The mixture is filtered thereafter, when the sediment caused by the acetate of lead containing the most of the coloring-matter remains upon the filter. Thereafter the solution thus obtained is slightly acidulated, preferably by adding oxalic acid in the proportion of ten grams per one hundred liters and per degree Baumé, which has the effect of causing a precipitate which settles very quick and easily and produces a clear solution. It is collected and evaporated to gall extract or tannic acid by known means. The removal of the impurities is readily effected on an extract of a density of 15° Baumé, which has the important advantage of considerably reducing the cost of the subsequent concentrating of the extract. Of course these temperatures and proportions may be varied.

By using acetate of lead in the small proportions set forth I am enabled to precipitate the coloring-matter without precipitating and losing any material portion of the tannin.

I am aware that it has been proposed to treat tannin solutions with acetate of lead which has been dissolved in connection with an acid; but in such case the acid materially prevents the precipitation of the coloring-matter, which therefore remains in the acid solution, discolors the same, and interferes with the ready production of a pure extract or of a pure tannic acid.

What I claim as my invention, and desire to secure by Letters Patent, is—

The process herein described of purifying watery tannic juices for making extracts or tannic acid, said mode consisting in first mixing the extracts with acetate of lead without the addition of any acid, separating the precipitate from the juice, and then subjecting the solution to the action of acids, preferably oxalic acid, in about the proportions herein described, thereby obtaining a further precipitate, substantially as described.

In testimony whereof I have signed my name to this specification in the presence of two subscribing witnesses.

LUDWIG SAARBACH.

Witnesses:
WM. A. POLLOCK,
DAVID N. MAXAR.